United States Patent
Rishe (10) Patent No.: US 6,339,773 B1
(45) Date of Patent: Jan. 15, 2002

(54) DATA EXTRACTOR

(76) Inventor: Naphtali Rishe, 100 Lincoln Rd., Miami Beach, FL (US) 33139

(*) Notice: Subject to any disclaimer, the term of this patent is extended or adjusted under 35 U.S.C. 154(b) by 0 days.

(21) Appl. No.: 09/415,998

(22) Filed: Oct. 12, 1999

(51) Int. Cl.[7] .............................................. G06F 17/30
(52) U.S. Cl. ............................ 707/4; 707/10; 707/101
(58) Field of Search ................................ 707/1, 4, 5, 6, 707/101, 10; 709/217, 250, 202; 345/357; 395/200.47, 200.8; 705/3, 39, 40

(56) References Cited

U.S. PATENT DOCUMENTS

| | | | | |
|---|---|---|---|---|
| 5,701,451 A | * | 12/1997 | Rogers et al. | 707/1 |
| 5,761,656 A | * | 6/1998 | Ben-Shachar | 707/4 |
| 5,774,123 A | * | 6/1998 | Matson | 345/357 |
| 5,819,265 A | * | 10/1998 | Ravin et al. | 707/5 |
| 5,860,072 A | * | 1/1999 | Schofield | 707/101 |
| 5,864,848 A | * | 1/1999 | Horvitz et al. | 707/6 |
| 5,870,746 A | * | 2/1999 | Knutson et al. | 707/101 |
| 5,892,908 A | * | 4/1999 | Hughes et al. | 395/200.8 |
| 5,881,232 A | * | 5/1999 | Cheng et al. | 395/200.47 |
| 5,918,013 A | * | 6/1999 | Mighdoll et al. | 395/200.47 |
| 5,995,939 A | * | 11/1999 | Berman et al. | 705/3 |
| 6,016,484 A | * | 1/2000 | Williams et al. | 705/39 |
| 6,061,665 A | * | 5/2000 | Bahreman | 705/40 |
| 6,065,039 A | * | 5/2000 | Paciorek | 709/202 |
| 6,085,222 A | * | 7/2000 | Fujino | 709/202 |
| 6,094,655 A | * | 7/2000 | Rogers et al. | 707/10 |
| 6,233,601 B1 | * | 5/2001 | Walsh | 709/202 |

OTHER PUBLICATIONS

Products Visual Design and Cross–Platform Execution http://www.datajunction.com/products/cambio_technical.html.
GlimpseGate http://phones.cybercell.net/~hsf/sources/glimpsegate/.
4.1 Overview http://slwww.enc.iis.sinica.edu/SSDA/helpfiles/citihelp.html.
Help on Citibase Data Extraction http:biscu.its.yale.edu/SSDA/helpfiles/citihelp.html.
HTML Presentation http://www.fortnet.org/ForNet/HTML/Presentation/stats/.
HTML2TEXT vl. 51 Http://www.telekabel.nl/sprinter/wieger/html2txt.htm.
HTMLess 2.0 http://elanor.sci.muni.cz/ar/ar407_Sections/news19.html.
SAC Software Agent Corporation Presents The Search Agent http://www.io.com/~sac/.
Lawrence Steve et al., IEEE Internet Computing, "Context and Page Analysis for Improved Web Search," Jul.–Aug. 1998, pp. 38–46.

* cited by examiner

*Primary Examiner*—Wayne Amsbury
*Assistant Examiner*—Thuy Pardo
(74) *Attorney, Agent, or Firm*—Rosenman & Colin LLP (57) ABSTRACT

A data extractor system for extraction, deformatting, and postformatting of data available on the WWW. A user, connected to the Internet/Web, contacts a fee-based intermediate data service which provides an interface to determine various aspects of the user's query, including output format. The intermediate data service generates a Java stripping agent which is sent to the user's browser to interface with a third party data provider. The Java stripping agent contains the knowledge to strip away the formatting of user interfaces. The system will allow buffering and streamlining between the user and web data providers; converting visual presentation of information into data for further processing, translating one data request into a cascade of data requests and pasting results together, filtering data output; allowing a variety of presentations of data different from the original presentation; optional dataflow between the user's applications and the third-party data providers bypassing interactive interfaces.

32 Claims, 9 Drawing Sheets

FIG. 1

ENHANCED INFORMATION SERVICES

Select Information Service | LawStreet ▼ | Go |—204

202

200

206 — • With this application you may get enhanced data from various Information Services Providers 208 — • You can save results of your query as various data formats. ◯ You can make advanced ad-hoc queries ← 210

212 — • As example, you can see the result of query to "Sears" via BellSouth:

214 — ☐ Text(tab-delimited) format,
　　216 — ☐ HTML format,
　　218 — ☐ Excel format,
　　220 — ☐ Microsoft Access format.

| | | | | | | |
|---|---|---|---|---|---|---|
| ALLSTATE INSURANCE COMPANIES-SALES OFFICE-JASPER-SEARS BLDG | | | | 714 | | PARKLAND SHO |
| MIRACLE EAR AT SEARS | 2550 | GALLERIA CIR | HOOVER | AL | 35244 | (205) 989-72 |
| SEARS A FRANK SEAT COVERS | 2311 | 7TH AVE S | BIRMINGHAM | | AL | 3523 |
| SEARS CARPET & UPHOLSTERY CLEANING | | | | AL | | (205 |
| SEARS CONTRACT SALES WAREHOUSE | 907 | ALTON PKWY | BIRMINGHAM | | AL | 3521 |
| SEARS HEARING AID CENTER | 2550 | GALLERIA CIR | BIRMINGHAM | | AL | 3524 |
| SEARS HEARING AID SYSTEMS | 7580 | CRESTWOOD BLVD | BIRMINGHAM | | AL | 3521 |
| SEARS OPTICAL | 3000 | RIVERCHASE GALLERIA | HOOVER | AL | 35244 | (205) 987-28 |
| SEARS PLUMBING & DRAIN CLEANING | | | | AL | | (205) 942-03 |
| SEARS PORTRAIT STUDIO | 6550 | AARON ARONOV DR FAIRFIELD | | AL | 35064 | (205 |
| SEARS PORTRAIT STUDIO | | BIRMINGHAM | | AL | | (205) 599-73 |
| SEARS PORTRAIT STUDIO | 2550 | GALLERIA CIR | BIRMINGHAM | AL | 35244 | (205 |
| SEARS RENT A CAR | 2301 | 3RD AVE S | BIRMINGHAM | AL | 35233 | (205 |
| SEARS ROEBUCK & CO | 2500 | RIVERCHASE GALLERIA | HOOVER | AL | 35244 | (205 |
| SEARS ROEBUCK AND CO | 2500 | GALLERIA CIR | BIRMINGHAM | AL | 35244 | (205 |
| SEARS ROEBUCK AND CO-APPAREL BOY'S | | 7500 | CRESTWOOD BLVD | BIRMINGHAM | | AL |
| SEARS ROEBUCK AND CO-AUTO CENTER | | 2500 | RIVER CHASE RD | BIRMINGHAM | | AL |
| SEARS ROEBUCK AND CO-GENERAL INFORMATION | | 715 | PARKLAND SHOPPING CTR N | | | JASP |
| SEARS ROEBUCK AND CO-HOME APPLIANCES & ELECTRONICS | | | 715 | PARKLAND SHOPPING | | CT |
| SEARS ROEBUCK AND CO-LAWN & GARDEN | | 715 | PARKLAND SHOPPING CTR N | | JASPER | AL |
| SEARS ROEBUCK AND C0-PEST CONTROL | | | | AL | | (205 |
| SEARS ROEBUCK AND CO-RETAIL STORE | | 6550 | AARON ARONOV DR | FAIRFIELD | | AL |
| SEARS ROEBUCK AND CO-RETAIL STORE-CENTURY PLAZA | | | | | AL | |
| SEARS SIDING AND WINDOWS | 2194 | PARKWAY LAKE DR | HOOVER | AL | 35244 | (205 |
| SEARS TERMITE & PEST CONTROL | | | AL | | (205) | 956-15 |
| SEARS TERMITE & PEST CONTROL | 2716 | COMMERCE SQ E | BIRMINGHAM | | AL | 3521 |
| SEARS, STEVEN R ATTY | 655 | MAIN ST | MONTEVALLO | AL | 35115 | (205) 665-12 |
| SEARS, WALTER J III ATTY | 2001 | PARK PL BIRMINGHAM | | AL | 35203 | (205 |
| SEARS CAR & TRUCK RENTAL | | | DECATUR | AL | (256) | 534-64 |
| SEARS CAR & TRUCK RENTAL-HUNTSVILLE AVIATION | | | | | AL | |
| SEARS CAR & TRUCK RENTAL-LOCAL RESERVATIONS & INFORMATION | | | | | | DECA |
| SEARS CAR & TRUCK RENTAL-LOCAL RESERVATIONS & INFORMATION | | | | 2901 | | UNIVERSITY D |
| SEARS CAR & TRUCK RENTAL-LOCAL RESERVATIONS & INFORMATION | | | | 8721 | | HIGHWAY 20 W |
| SEARS CAR & TRUCK RENTAL-LOCAL RESERVATIONS & INFORMATION | | | | | | HUNT |
| SEARS CARPET & UPHOLSTERY CLEANING | | 425 | GRANT ST SE | DECATUR AL | | 3560 |
| SEARS DEALER STORE | | AL | HWY 157, | MOULTON, AL | | (256 |
| SEARS HEARING AID CENTER | 5901 | HIGHWAY 72 W | HUNTSVILLE | | AL | 3580 |
| SEARS HEARING AID CENTER | 1801 | BELTLINE RD SW | DECATUR | AL | 35601 | (256 |
| SEARS PORTRAIT STUDIO | 1801 | BELTLINE RD SW DECATUR | | AL | 35601 | (256) 351-52 |
| SEARS PORTRAIT STUDIO | 5901 | UNIVERSITY DR NW | | HUNTSVILLE | AL | 3580 |
| SEARS ROEBUCK & CO-RETAIL STORE-LAWN & GARDEN EQUIPMENT | | 5901 | UNIVERSITY DR NW | | | |
| SEARS ROEBUCK AND CO-RETAIL STORE-GENERAL INFORMATION | | 5901 | UNIVERSITY DR NW | | | |
| SEARS ROEBUCK AND CO-RETAIL STORE-GENERAL INFORMATION | | 5901 | UNIVERSITY DR NW | | | |
| SEARS ROEBUCK AND CO-RETAIL STORE-GENERAL INFORMATION | | 1801 | BELTLINE RD SW | | | DECA |
| SEARS ROEBUCK AND CO-RETAIL STORE-GENERAL INFORMATION | | | | | AL | |
| SEARS, JAMES OFC | | | AL | | (256) 880-0659 | |
| BLOCK H & R-SEARS LOCATION | | | MOBILE AL | | (334) | 470-66 |
| BUDGET CAR & TRUCK RENTAL-SEARS RENT A CAR | | | | | AL | |
| SEARS | 19588 | S GREENO RD | FAIRHOPE | AL | 36532 | (334) 990-0017 |
| SEARS AUTHORIZED CARPET CLEANING | | 852 | HOLCOMBE AVE | MOBILE | AL | 3660 |
| SEARS AUTHORIZED CARPET CLEANING | | 852 | HOLCOMBE AVE | MOBILE | AL | 3669 |
| SEARS AUTHORIZED CARPET CLEANING | | 101 | N FRANKLIN ST | MOBILE | AL | 3660 |
| SEARS AUTHORIZED RETAIL DEALER | | 19588 | S GREENO RD | FAIRHOPE | AL | 3653 |
| SEARS CAR & TRUCK RENTAL | | | AL | | (334) | 633-06 |
| SEARS CAR & TRUCK RENTAL-RESERVATIONS & INFORMATION | | | | | | AL |
| SEARS HEARING AID SYSTEMS | | 3201 | BEL AIR MALL | MOBILE | AL | 36606 (334 |
| SEARS PORTRAIT STUDIO | 3201 | BEL AIR MALL | MOBILE | AL | 36606 | (334) 470-66 |
| SEARS ROEBUCK AND CO-GENERAL INFORMATION | | | 3201 | BEL AIR MALL | MOBILE | AL |
| SEARS TELECENTER | 3412 | DEMETROPOLIS RD MOBILE AL | | 36693 | (334) | 661-60 |
| SEARS, JAMES D ATTY | 61 | ST JOSEPH ST | MOBILE AL | | (334) | 433-52 |
| SEARS, JAMES OFC | 318 | MAGNOLIA AVE | FAIRHOPE | | AL | 36532 (334 |

FIG. 4

| | | | | |
|---|---|---|---|---|
| BLOCK H & R-SEARS LOCATION | | ALBANY | GA | (912) 434-4300 |
| SEARS CAR RENTAL | 3905 NEWTON RD | ALBANY | GA 31707 | (912) 434-7502 |
| SEARS PORTRAIT STUDIO | | ALBANY | GA | (912) 434-4351 |
| SEARS PRODUCTS & SERVICES | 2815 GILLIONVILLE RD | ALBANY | GA 31707 | (912) 483-9898 |
| SEARS ROEBUCK AND CO-GENERAL INFORMATION | 2601 DAWSON RD | ALBANY | GA 31707 | (912) 434-4300 |
| SEARS ROEBUCK AND CO-GENERAL INFORMATION | 1408 E SHOTWELL ST | BAINBRIDGE | GA 31717 | (912) 246-5877 |
| BLOCK H & R-SEARS LOCATION | 3401 MASONIC DR | ALEXANDRIA | LA 71301 | (318) 484-7253 |
| SEARS | 1339 N PINE ST | DERIDDER | LA 70634 | (318) 463-3257 |
| SEARS AUTHORIZED RETAIL DEALER | 636 MOREAU ST | BUNKIE | LA 71322 | (318) 253-0550 |
| SEARS AUTHORIZED RETAIL DEALER | 363 MOREAU ST | MARKSVILLE | LA 71351 | (318) 253-0550 |
| SEARS OPTICAL | 3401 MASONIC DR | ALEXANDRIA | LA 71301 | (318) 443-0013 |
| SEARS PORTRAIT STUDIO | 3401 MASONIC DR | ALEXANDRIA | LA 71301 | (318) 484-7251 |
| SEARS ROEBUCK AND CO | 3401 MASONIC DR | ALEXANDRIA | LA 71301 | (318) 484-7200 |
| SEARS ROEBUCK AND CO-GENERAL INFORMATION | 900 N 5TH ST | LEESVILLE | LA 71446 | (318) 238-1371 |
| SEARS HEARING AID CENTER | 3101 N MAIN ST | ANDERSON | SC 29621 | (864) 226-7742 |
| SEARS PORTRAIT STUDIO | 3131 N MAIN ST | ANDERSON | SC 29621 | (864) 261-4205 |
| SEARS ROEBUCK & CO-CLEMSON-AUTHORIZED RETAIL DEALER STORE-GENERAL INFORMATION | 1019 TIGER BLVD | CLEMSON | SC 29631 | (864) 654-1620 |
| SEARS STEVE GARAGE | 186 CHEROKEE RD | WILLIAMSTON | SC 29697 | (864) 847-4576 |

FIG. 5

The SQL queries to BellSouth Yellow Pages Database

You can issue one or many SQL queries to BellSouth Yellow Pages. ← 602

- The name of the table, which consists Yellow Pages is AllBell. ← 604
- Each SQL query should have the semicolon (;) marker on the end. ← 606
- The results of the last query could be displayed on the screen. ← 608
- You should specify the list of field names for getting thes results. ← 610
- The number of output lines is limited to 500 lines. ← 612

Please, look into examples of SQL queries and feel free to modify them or put your own SQL query: ← 614

- Business, which are located in some zip-code ← 616
- Count all Business, which are located in some zip-code (Count example) ← 618
- Select phones like '348%' (results is not displayed - just for demonstration how to issue many SQL commands) then Show all distinct cities. ← 620
  ← 622

Output columns:

| Businessname HouseNumber Street City State ZIP AreaCode Phon | ← 624

Series of SQL statements (please, end with ; symbol each of these statements):

[text area] ← 626

[Tab-delimited text ▼] ← 628

The SQL queries to BellSouth Yellow Pages Database:

Output columns:

| Businessname HouseNumber Street City State ZIP AreaCode Phon | — 624

Series of SQL statements (please, end with ; symbol each of these statements):

```
Select *    from AllBell where zip-33199;
```
701 — 716 — 626

Tab-delimited text ▼ — 628

The SQL queries to BellSouth Yellow Pages Database:

Output columns:

| CountResults | — 624 |

Series of SQL statements (please, end with ; symbol each of these statements):

702 —  
```
Select count (*)  as CountResults from AllBell where zip-33174
                         ↑
                        718
```
— 626

| Tab-delimited text ▼ | — 628

DATA EXTRACTOR

BACKGROUND OF THE INVENTION

1. Field of Invention

The present invention relates generally to the field of data retrieval. More specifically, the present invention is related to a business model which provides a fee-based, real-time, intermediary service including a method of extracting data from third party providers, removing existing formatting information and returning the data to the requester in a desired format.

2. Discussion of Prior Art

The proliferation of the Internet and World Wide Web (WWW) has produced a deluge of information often times in unmanageable formats to the average user. To assist the user, various search engines have been developed which work through the user's browser to keyword search various indexed data sources. While search results of text Web pages may be easy to manage, search results of structured type data prove not to be so easily managed. Typically database results are returned preformatted in HTML, text or spreadsheet forms. The user, however, has no means of selecting a format not envisioned by the data supplier. The user may want to select a data output only in spreadsheet format for direct integration into locally stored table structures. Most users cannot perform such a conversion because of software or hardware limitations, and certainly not in real-time. What is needed is an intermediate service provider through which a user can enhance their data retrieval by customizing the data output without having to create complex algorithms or mapping structures locally on their PC. The following prior art describes various attempts to extract data from database sources located on the Web.

The patent to Schofield (U.S. Pat. No. 5,860,072), assigned to Tandem Computers Incorporated, provides for a *Method and Apparatus for Transporting Interface Definition Language-Defined Data Structures Between Heterogenous Systems*. Data strings are stored locally in a receiving computer's buffer and thereafter, the data structure extracted, realigned and stored. Column 4, lines 37–39 suggest an Internet embodiment.

The patent to Horvitz et al. (U.S. Pat. No. 5,864,848), assigned to Microsoft Corporation, provides for a *Goal-Driven Information Interpretation and Extraction System*. Column 1, lines 47–52 suggest the extraction of data from Internet web pages.

The web page entitled, "Visual Design and Cross-Platform Execution", provides for a technical overview of the software product "Cambio." Cambio extracts the desired data fields (which can be spread across multiple lines in a text file) and assembles those fields into a flat record of data. These records are presented in the conventional row/column, tabular format (see http://www.datajunction.com/products/cambio_technical.html).

The web page entitled, "GlimpseGate", provides for context searching of html web documents with data strings (see http://phones.cybercell.net/~hsf/sources/glimpsegate/).

Additional data extractors can be found in the following patents, web pages and articles:

U.S. Pat. No. 5,761,656 to Ben-Shachar, U.S. Pat. No. 5,819,265 to Ravin et al.; U.S. Pat. No. 5,870,746 to Knutson et al.; U.S. Pat. No. 5,881,232 to Cheng et al., and U.S. Pat. No. 5,892,908 to Hughes et al., Web sites:

4.1 Overview -http://skwww.enc.iis.sinica.edu.tw/user-manual/node42.html;

HelponCitibaseDataExtraction- http://biscu.its.yale.edu/SSDA/helpfiles/citihelp.html HTML Presentation - http://www.fortnet.org/FortNet/HTML/Presentation/stats/

HTML2TEXT v1.51- http://www.telekabel.nl/sprinter/wieger/html2txt.htm

HTMLess 2.0- http://elanor.sci.muni.cz/ar/ar407_Sections/news19.html

NeXtract - http://www.nextract.com

Article: SAC Software Agent Corporation Presents The Search Agent - http://www.io.com/~sac/, and article by Lawrence, Steve et al., *IEEE Internet Computing*, "Context and Page Analysis for Improved Web Search", July–August 1998, pp. 38–46.

Whatever the precise merits, features and advantages of the above cited references, none of them achieves or fulfills the purposes of the present invention, one of which specifically to provide an E-commerce business model and system including an intermediate service provider through which a user can enhance their WWW data retrieval by customizing the data output in realtime without creating and maintaining complex data mapping algorithms. The prior art shows that both stripping algorithms and Java agents are known, however, neither have been used to dispatch intermediary agents for real-time extraction of structured data from HTML pages accessed by the user and arbitrary post-processing of third party data.

These and other objectives are achieved by the detailed description that follows.

SUMMARY OF THE INVENTION

A data extractor system for the extraction, deformatting, and postformatting of data available on the WWW. The system enables buffering and streamlining between the user and web data providers; converting the visual presentation of information into data for further processing, translating one data request into a cascade of data requests and pasting results together, filtering data output; allowing a variety of presentations of data different from the original presentation; optional dataflow between the user's applications and the third-party data providers thereby bypassing interactive interfaces.

A user, connected to the Internet/Web, contacts an intermediate data service which provides an interface to determine various aspects of the user's query, including output format. The intermediate data service generates a stripping agent, such as a Java program, which is sent to the user's browser to interface with a third party data provider. The Java stripping agent contains the knowledge to strip away the formatting of user interfaces such as HTML, reformat, reorganize, filter and present the data in real-time in a user-selected format. The present invention:

1. Embeds all user input in a standardized way in a URL (CGI), hiding from the user various data entry protocols such as post-data, Java script data entry forms, etc. Thus, allowing the user to:
    a. bookmark this URL with predefined input data
    b. embed this URL in various user scripts
2. Converts the formatted data retrieved from third party data provider into an ASCII file, one line per result, tabs separating fields; eliminating all graphics and irrelevant text, leaving only data allowing:
    a. convenient downloading of data into user applications
    b. compact results
    c. development of embedded applications 3. When a third-party site gives a few records at a time and a "next" button, the present invention recursively dispatches an agent to recursively call the third-party data provider to give the user in one operation a large volume of data.
4. In addition to plain ASCII output by default, the user will be able to parametrically specify additional forms of output:
   formatted ASCII (72 characters per line, aligned spaces instead of tabs, one field can continue on several lines)
   RTF
   HTML tables
   PDF
   Postscript
   And others The present invention delivers standardized extracted graphic files of spatial data: maps, remote-sensing images, etc.

5. The user can specie a parameter EGREP_SCREEN giving a regular expression to screen the output or a simplified parameter KEYWORDS_SCREEN. (Note: this is post-processing of results after they are received from third-party providers)
6. In an alternative embodiment, the intermediate data service subscribes to a variety of pay-per-use services and re-delivers information to paying customers. The end user's convenience, in addition to repackaging, will be that the user does not have to subscribe to many services, just to the intermediate data service (a charge includes a small mark-up, or no mark-up if wholesale rates are obtained).
7. In an alternative embodiment, the system performs merges and joins between data from more than one server.
8. In an alternative embodiment, certain joins will be allowed within same site, e.g., by traversing pointers to product detail from product list.
9. In an alternative embodiment, the system includes a virtual conceptual semantic schema of all WWW information accessible by the user via the service and allow the user to specify complex database query against same schema without knowing which third-party sites need to be accessed or joined to perform the query.
10. The program can employ Java-agent technology, which agent will perform all the activities at user site; reducing traffic on the intermediate data service and will also protect the intermediate service provider from possible claims of third-party data providers regarding reselling or storing of their data contrary to license or copyright provisions.
11. The program will allow a number of post-formatting options, including:
    audio file produced after adding connecting words to properly delineate fields (it is impossible to produce a meaningful audio file without first stripping output and delimiting fields with connecting words)
        smart translation into other languages; The present invention will decide which fields should be translated and which should not, exercising its knowledge of the semantics of the data source.
12. The program is written in such a way that definitions of the tird-party web site protocols are outside of the program, in a Knowledge Base, and easy to maintain and change by a low-skilled staff.
13. The intermediate data service maintains a large database or references to data providing sites whose input/output stripping instructions are known.
14. When no parameters are given, the present invention replies with a list of third party services it knows to query, the kind of information they provide, and list of field names.
15. Examples of services to be supported are:
    various white and yellow phone directories
    business directories and classification (SIC)-zip2.com
    weather services
    stock quotes (input: a list of ticker symbols)
    public English dictionaries, bilingual dictionaries, and thesauri
    web search engines (Dog Metafind; Yahoo!; Infoseek)
    geographic text servers (zipcode<—>city, address<->area code <->airport code)
    online translators
    airline schedules and flight info (airline-specific sites)
    professional directories: doctors, lawyers
    Microsoft aerial photography
    maps

BRIEF DESCRIPTION OF THE DRAWINGS

FIG. 4 illustrates an example output in text(tab-delimited) format.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 1:
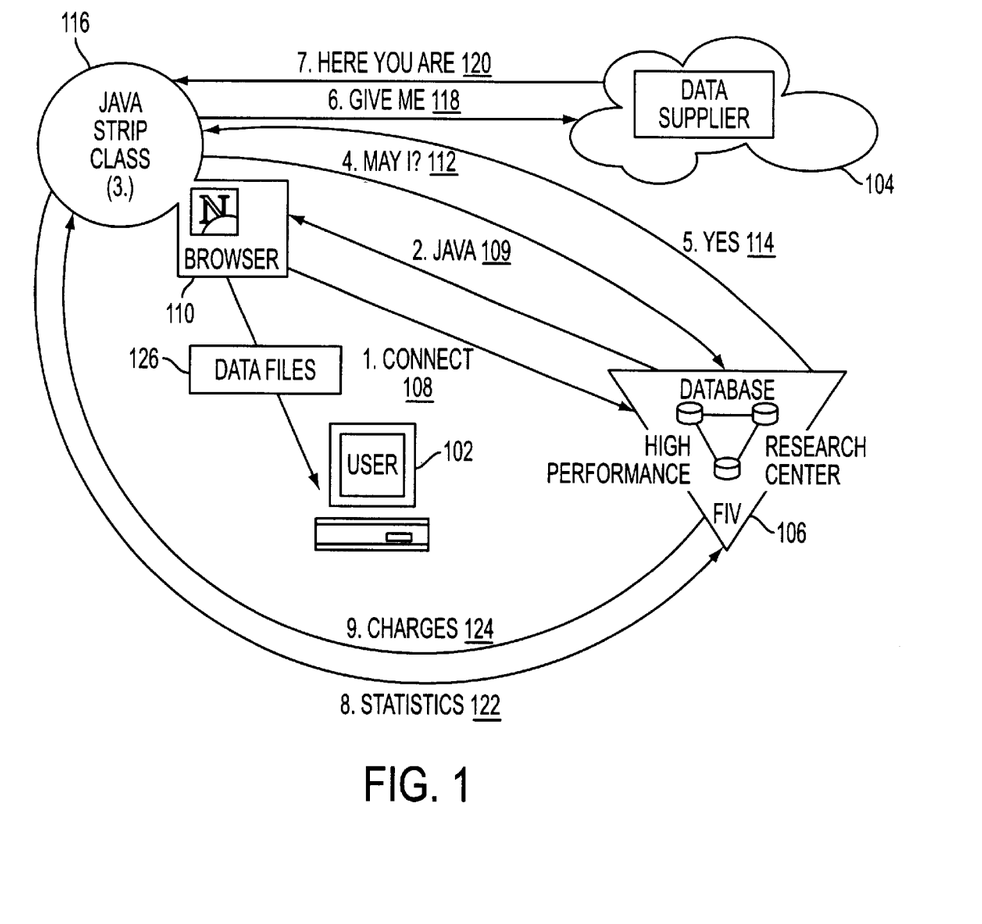
FIG. 1 illustrates a flowchart of the present invention.

FIG. 1 illustrates a flow diagram of a user 102 connecting to a data supplier 104 to perform a search during a typical search session using known Internet/WWW search engines such as Lycos®, Excite®, Snap®, Infoseek®, Webcrawler®, etc. User 102 represents a PC owner with Internet access and a browser 110 (e.g., Netscape® or Microsoft Explorer®), WebTV□, or other Internet/WWW access methods.

The present invention provides for an intermediate data service enhancement 106 enabling the user to: strip 116 away the formatting of user interfaces such as HTML used by either the data provider 104 or browser 110, reformat, reorganize, filter and present the data 126 in a user selected format. User 102 connects 108 to intermediate data service enhancement 106 through their browser 110. Intermediate data service enhancement 106 provides a user with a search enhancement interface (FIGS. 2–7c) to determine a choice of data supplier 104, return data format, and query. Intermediate data service enhancement 106 returns 109 ajava strip class algorithm 116 to the user's system to enable realtime local enhancement. The strip algorithm 116 retrieves the requested data 118/ 120 strips the non-data. formatting, reformats, reorganizes, filters and presents the data 126 in a user selected format 126.

Figure 2:
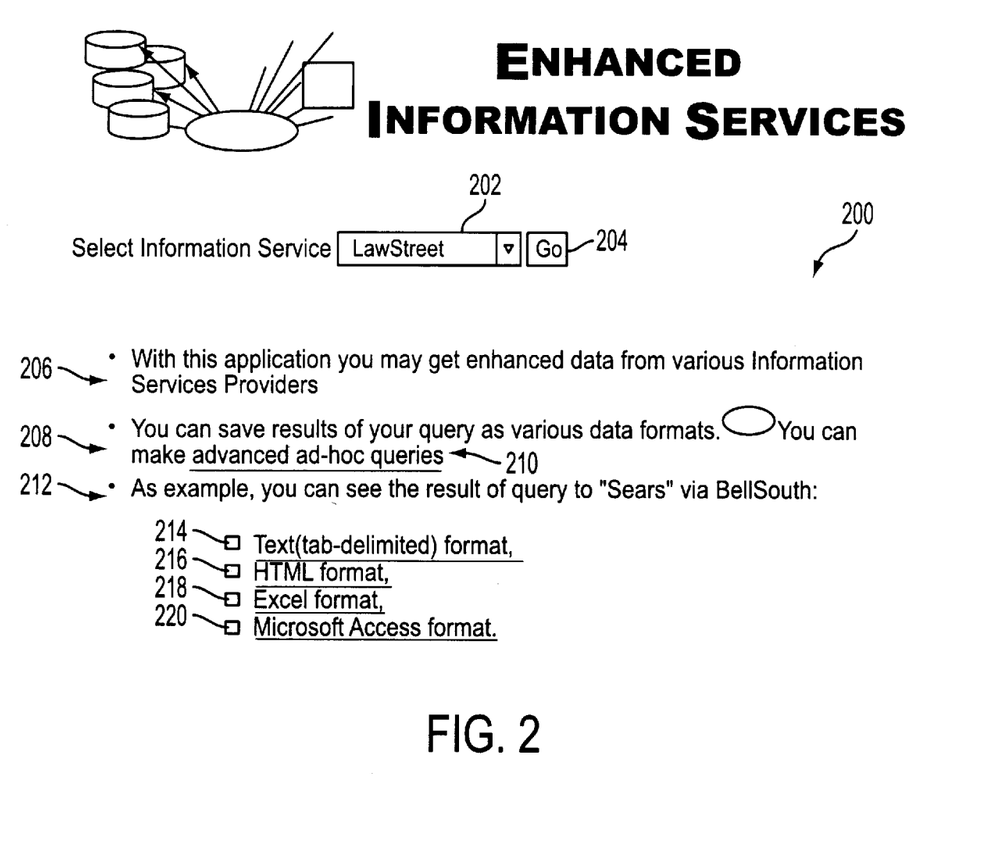
FIG. 2 illustrates an enhanced information services interface.

FIG. 2 illustrates a typical user interface 200 provided by the intermediate data service enhancement 106. User 102 first selects an Information Service 202 such as LawStreet® (shown), Bellsouth®, Excite®, Webcrawler®, Lycos®, Snap®, Goto®, Scrubtheweb®, MSN®, or a generic search engine—search and actuates this selection by selecting "Go". Instructions provided include:

a. With this application you may get enhanced data from various Information Service Provider—206
 b. You can save the results of your query as various formats—208. You can make advanced ad-hoc queries 210
 c. Working example(s)—212 in formats 214 (text (tab-delimited), HTML, Excels®, Microsoft Access®.

Figure 3:
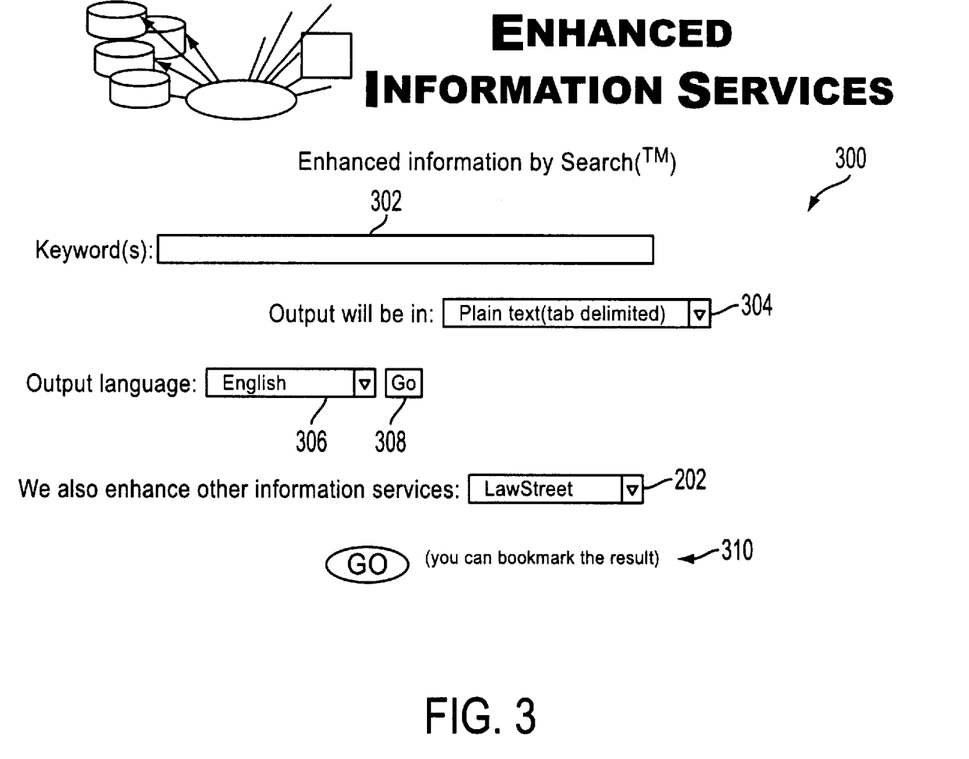
FIG. 3 illustrates an enhanced keyword search interface.

Upon actuation of the "Go" button 204, the user receives the next user interface 300 as shown in FIG. 3. Entry box 302 enables the user to enter typical keyword(s) normally used during a search. Drop-down menu 304 enables the user to select a desired output format such as "plain text (tab-delimited)"—shown, HTML, Excel®, Microsoft Access®, or other known data formats. Drop-down menu 306 enables a selection of language, e.g., English (shown), French, German, Italian, etc., for the returned data. Upon selecting keywords, output format and language, the user can start the creation of a java strip algorithm by selecting "Go" or change information service providers at 202. In addition, the user can bookmark 310 the result for future access. Intermediate data service enhancement 106 returns ajava strip class algorithm Oava strip agent) which works locally with the user's browser 110 to return a "data only" result in the format selected by the user selections registered in the steps outlined above. All Java® strip agents 116 created by the intermediate data service enhancement 106 system are retained therein for quick future access by a requesting user.

Figure 5:
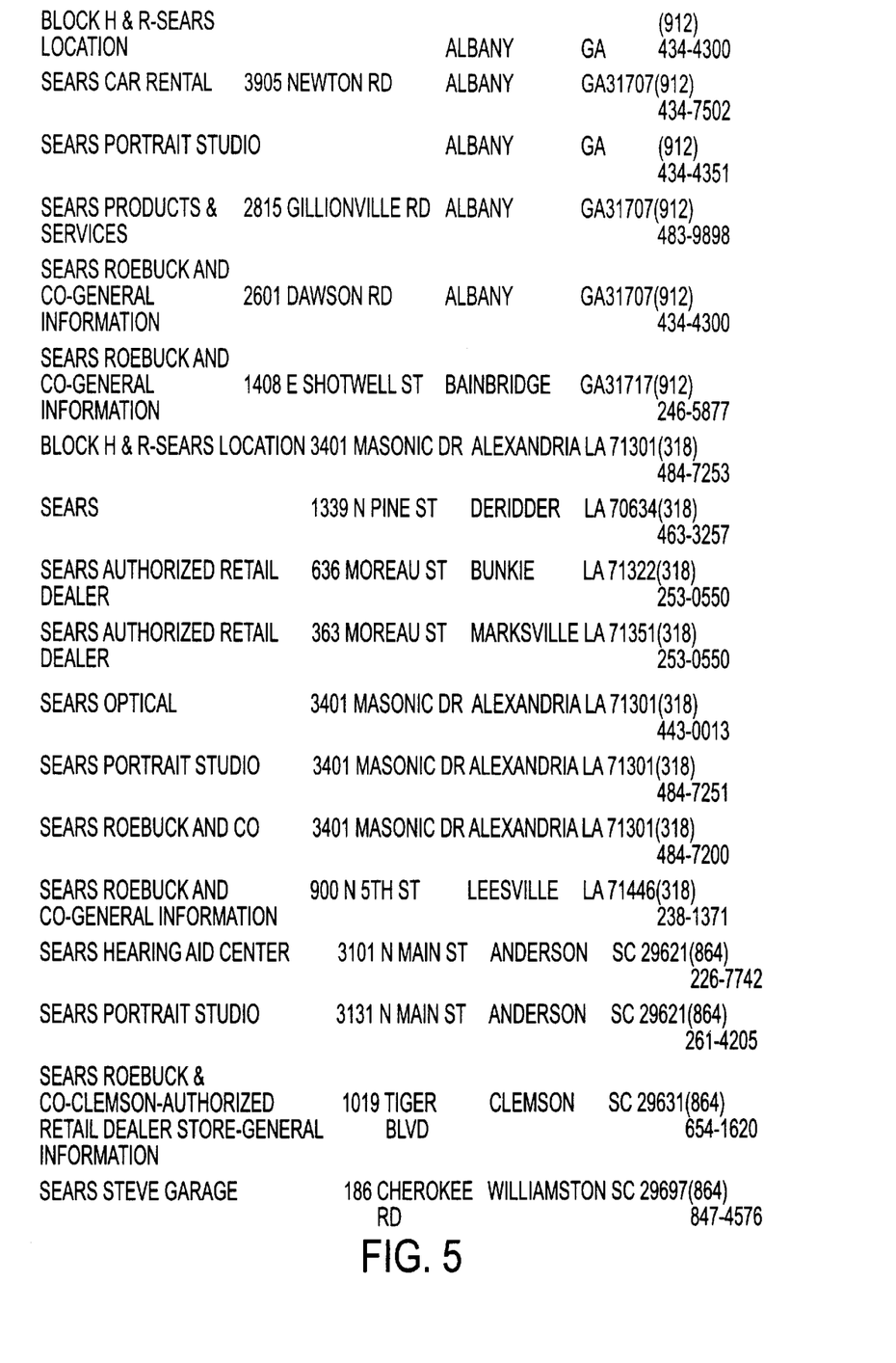
FIG. 5 illustrates an example output in HTML format.

FIGS. 4 and 5 illustrate two possible outputs of the example 212. In this example, the user selected "BellSouth" as the service provider 202, "Sears" as the keyword 302, "English" as the output language 306 and "plain text (tab-delimited)" as the output shown in FIG. 4 and HTML as shown in FIG. 5.

Figure 6:
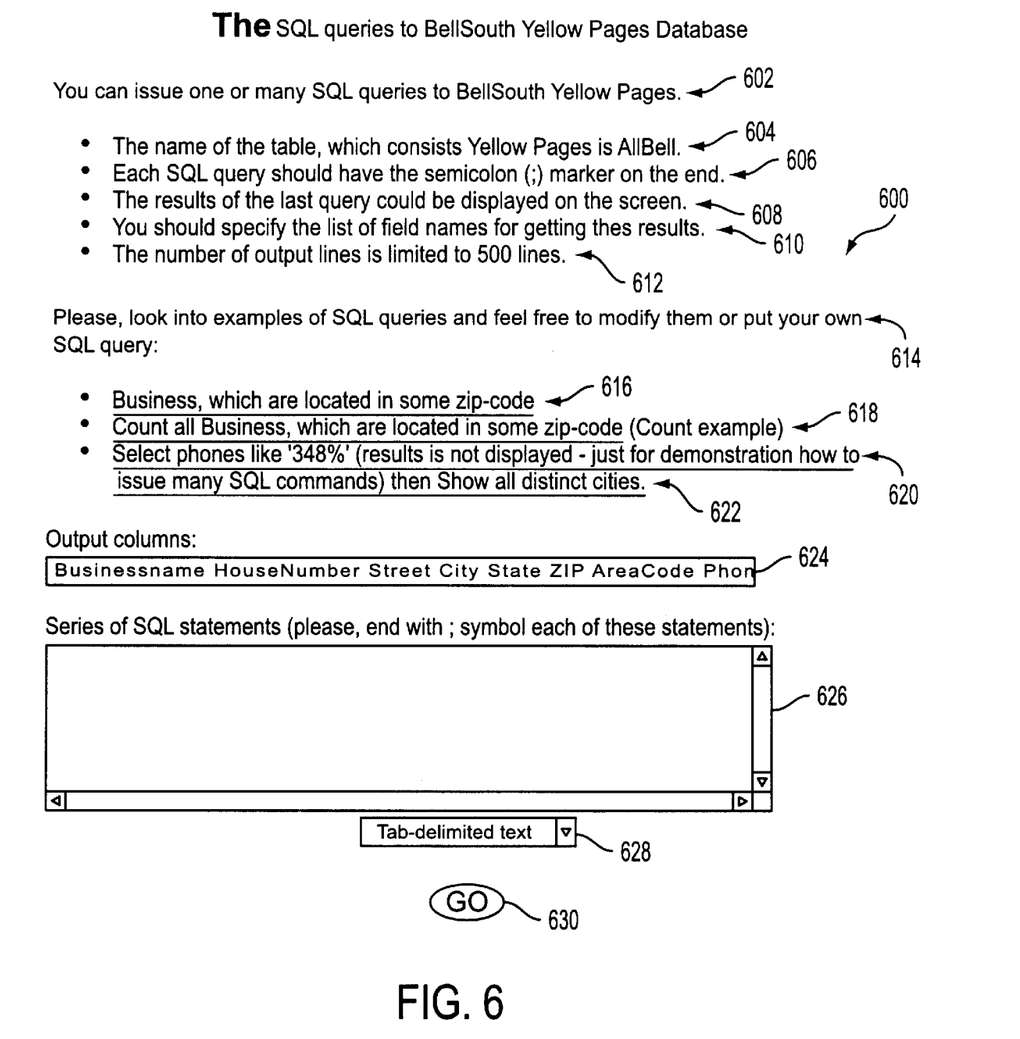
FIG. 6 illustrates an SQL interface.

In addition to simple keyword searches, advanced ad-hoc queries 210 can be made with relative ease. FIG. 6 illustrates the SQL (structured query logic) query interface 600 with BellSouth Yellow Pages chosen as the service provider. The user is given guidance instructions 602–622 describing basic SQL procedures related to BellSouth databases as follows:

BASIC PARAMETERS OF THE DATABASE

The user can issue one or many SQL queries to BellSouth Yellow Pages. 602

The name of the table, which consists Yellow Pages is "AllBell"—604
 Each SQL query should have the semicolon(;) marker on the end—606
 The results of the last query could be displayed on the screen—608
 The user should specify the list of field names for getting these results—610
 The number of output lines is limited to 500 lines.—612

EXAMPLES

Please look into examples of SQL queries and feel free to modify them or put your own SQL query:—614

Businesses which are located in some zip-code—616
 Count all businesses, which are located in some zip-code (count example)—618
 Select phones like "348%" 620, then show all distinct cities—622

Figure 7A:
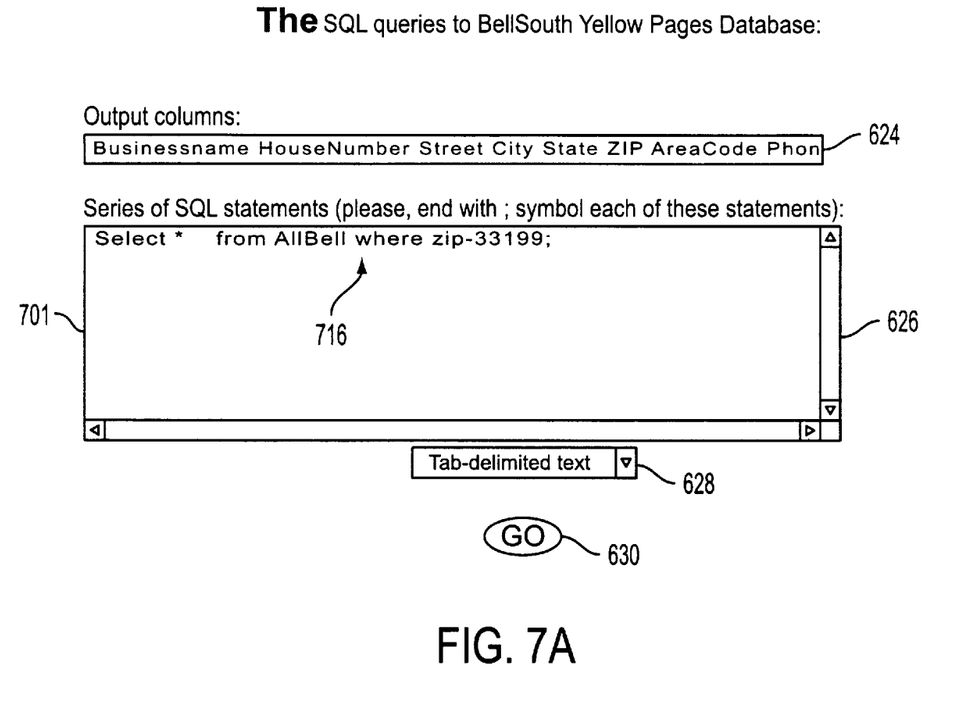
FIGS. 7a–c collectively illustrate a SQL example.
Figure 7B:
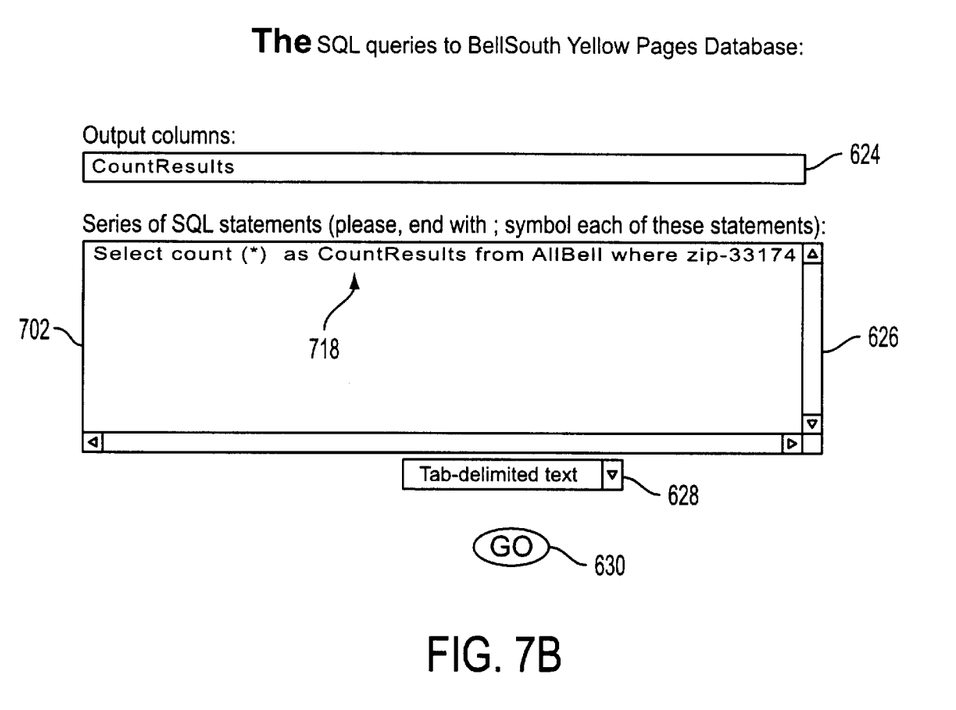
Figure 7C:
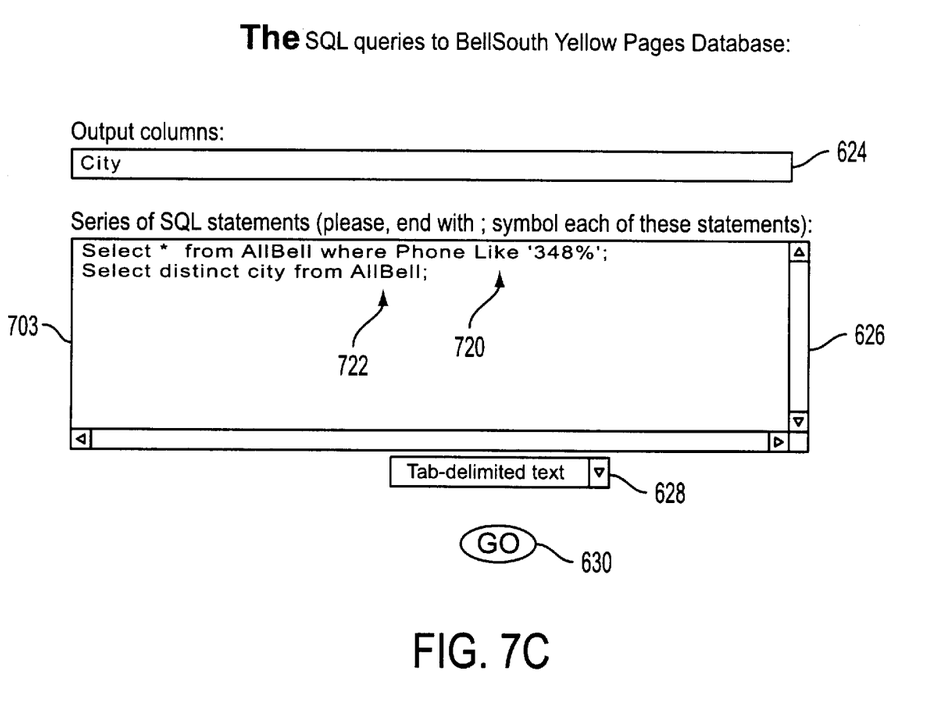

As each hypertext example 616–622 is selected, the interfaces shown in FIGS. 7a–7c reveal the actual SQL query entered into the series of SQL statements entry box 626. FIG. 7a illustrates the SQL entry 701 "Select * from AllBell where zip=33199"; 716 correlating to the text example 616. FIG. 7b illustrates the example 618 which produces the SQL entry 702 "Select count (*) CountResults from AllBell where zip=33174";—718. FIG. 7c illustrates the examples 620/622 which produce the SQL entries 703 "Select* from AllBell where Phone Like 348%";—720; Select distinct city from Allbell;—722".

The remainder of SQL selections include Output columns 624 desired for data output and output format 628. "Go" 628 actuates the SQL process, creating the Java® Strip Class algorithm 116 equating to the SQL and enhanced data output selections which is then returned to the user 102.

The dispatched agent retrieves and reformats the data. Limited amounts of results are delivered to the user at no charge. Larger amounts are charged in correlation to the amount of data retrieved. The user has the option to order a preview and sampling of data before the full set is delivered and the charge is effected. In an alternative embodiment, the user purchases a license for unlimited utilization of the service. Additionally, the service can be provided free to the user and payments made by advertisers or other third parties. Furthermore, in some situations, no charges would be incurred at all.

Format of the default ASCII output follows:

row separator: newline (+ optionally carriage return if parameter DOS=y is given)
 field separator: tab or other user-specified delimiter
 structure:
 <document titles>
 =
 <lines of column headers>
 ==
 <data>
 ===
 <informational messages, including sites contacted queries performed, time stamps, statistics>
 <error messages>
 ====
 <optional promotional material and paid advertisements>
 <links to third party services used>

The above enhancements for data extraction and its described functional elements are implemented in various computing environments. For example, the present invention may be implemented on a conventional IBM PC or equivalent, multi-nodal system (e.g. LAN) or networking system (e.g. Internet, WWW). All programing, Java strip agent algorithms, GUIs, display panels and dialog box templates, and data related thereto are stored in computer memory, static or dynamic, and may be retrieved by the user of the present invention in any of: conventional computer storage, display (i.e. CRT) and/or hardcopy (i.e. printed) formats. The programming of the present invention may be implemented by one of skill in the art of database, Internet related and E-commerce programming.

CONCLUSION

A system and method has been shown in the above embodiments for the effective implementation of a data extractor. While various preferred embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, database management system, database management model, directory structure, DBMS-file linking technology, the type of user interface, computer hardware platform, network operating system, programing language of the agents, archiving software, or archiving hardware. In addition, the present invention can be implemented locally on a single PC, connected workstations (i.e. networked-LAN), across extended networks such as the Internet or using portable equipment such as laptop computers or wireless equipment (RF, microwaves, infrared, photonic, etc.)

What is claimed is:

1. An E-commerce system generating revenues by providing a data extraction service for an end user comprising the method:

receiving at said data extracion service a request from said end user comprising a database query to a data supplier;

said data extracton service providing a graphical user interface to said end user, said graphical user interface requesting at least data output formatting requirements;

said data extraction service generating a java agent based on at least said database query and formatting requirements;

said data extraction service communicating said java agent to said end user;

said end user implementing locally said java agent to extract data from said data supplier, said data further comprising multiple first data sets that are joined into a second data set, said second data set returned to said end user in said format specified, and said data exaction service billing said end user for use of the created java agents.

2. An E-commerce system generating revenues by providing a data extraction service for an end user as per claim 1, wherein said data extraction includes stripping formatting information and reformatting in the requested format.

3. An E-commerce system generating revenues by providing a data extraction service for an end user as per claim 2, wherein said step of stripping formatting information includes stripping H sML formatting.

4. An E-commerce system generating revenues by providing a data extraction service for an end user as per claim 2, wherein said step of stripping formatting information includes tripping graphics from HTML data.

5. An E-commerce system generating revenues by providing a data extraction service for an end user as per claim 2, wherein said stripping and reformatting is performed locally at the end user's location.

6. An E-commerce system generating revenues by providing a data extraction service for an end user as per claim 5, wherein said stripping and reformatting is performed in realtime.

7. An E-commerce system generating revenues by providing a data extraction service for an end user as per claim 1, wherein said agents are retained by said data extraction service for future use.

8. An E-commerce system generating revenues by providing a data extraction service for an end user as per claim 1, wherein said user interface further includes a selection from known data suppliers.

9. An E-commerce system generating revenues by providing a data extraction service for an end user as per claim 1, wherein said user interface further includes SQL query capability.

10. An E-commerce system generating revenues by providing a data extraction service for an end user as per claim 1, wherein said user interface further requests a language formal. to return data to said end user.

11. A Web based system for data extraction comprising:

a data requestor connected to the Web;

a third party data provider;

an intermediate service provider, said intermediate service provider receiving a request for data from said requester for data located at said third party data provider;

said intermediate service provider providing a graphical user interface to said requestor, said graphical user interface requesting at least data formatting requirements;

said intermediate service provider generating a java agent based on at least said request for data and formatting requirements;

said intermediate service provider comnunicating said java agent to said requestor;

said end user implementing said java agent to extract data from said data supplier, said data further comprising multiple first data sets that are joined into a second data set, and said second data set returned to said end user in said format specified.

12. A Web based system for data extraction as per claim 1, wherein said requestor is billed for the services provided by said intermediate service provider.

13. A Web based system for data extraction as per claim 11, wherein said data extraction includes stripping formatting information and reformatting in the requested format.

14. A Web based system for data extraction as per claim 13, wherein said step of stripping formatting information includes stripping HTML formatting.

15. A Web based system for data extraction as per claim 13, wherein said step of stripping formatting information includes stripping a graphics from HTML data.

16. A Web based system for data extraction as per claim 13, wherein said stripping and reformatting is performed locally at the end user's location.

17. A Web based system for data extraction as per claim 11, wherein said stripping and reformatting is performed in real-time.

18. A Web based system for data extraction as per claim 11, wherein said agents are retained by said intermediate service provider for future use.

19. A Web based system for data extraction as per claim 11, wherein said graphical user interface further includes a selection from known data suppliers.

20. A Web based system for data extraction as per claim 11, wherein said graphical user interface further includes SQL Capability.

21. A Web based system for data extraction as per claim 11, wherein said graphical user interface further requests a language parameter to return data to said end user.

22. A computer-based method of extracting data in a selected format from third party data providers comprising:

receiving from a request for data from a computer user connected to a computer network, contacting a data extraction service provider;

said data extraction service provider requesting at least a source and output format of a data query, and said data extraction service provider requesting to said computer user a stripping agent to reformat said data from said source format to said output format and to enable said computer user to obtain said data from said data source in the requested output format, said data from said data source further comprising multiple first data sets and said reformatting of said data further comprising joining said multiple first data sets into a single, second data set.

23. A computer-based method of extracting data in a selected format from third party data providers as per claim 22, wherein said stripping agent strips formatting information including HTML.

24. A computer-based method of extracting data in a selected format from third party data providers as per claim 22, wherein said stripping agent strips formatting information including graphics from HTML data.

25. A computer-based method of extracting data in a selected format from third party data providers as per claim 22, wherein said stripping and formatting is performed locally at the computer user's location.

26. A computer-based method of extracting data in a selected format from third party data providers as per claim 22, wherein said stripping and formatting is performed in real-time.

27. A computer-based method of extracting data in a selected format from third party data providers as per claim 22, wherein said stripping agents are retained by said data extraction service provider for future use.

28. A computer-based method of extracting data in a selected format from third party data providers as per claim 22, wherein said step of said data extraction service provider requesting at least a source and output format of a data query is provided by a user interface.

29. A computer-based method of extracting data in a selected format from third party data providers as per claim 28, wherein said user interface further includes SQL capability.

30. A computer-based method of extracting data in a selected format from third party data providers as per claim 28, wherein said graphical user interface further requests a language parameter to return data to said end user.

31. A computer-based method of extracting data in a selected format from third party data providers as per claim 28, wherein said graphical user interface further includes as selection from known data suppliers.

32. A computer-based method of extracting data in a selected format from third party data providers as per claim 22, wherein said requestor is billed for the services provided by said data extraction service provider.

* * * * *